Dec. 27, 1932.  C. T. PEACOCK  1,892,002
COMBINED LISTER AND DAM FORMING DEVICE
Filed Feb. 15, 1932  2 Sheets-Sheet 1

Inventor
Charles T. Peacock.
By A. J. O'Brian
Attorney

Dec. 27, 1932.  C. T. PEACOCK  1,892,002
COMBINED LISTER AND DAM FORMING DEVICE
Filed Feb. 15, 1932  2 Sheets-Sheet 2
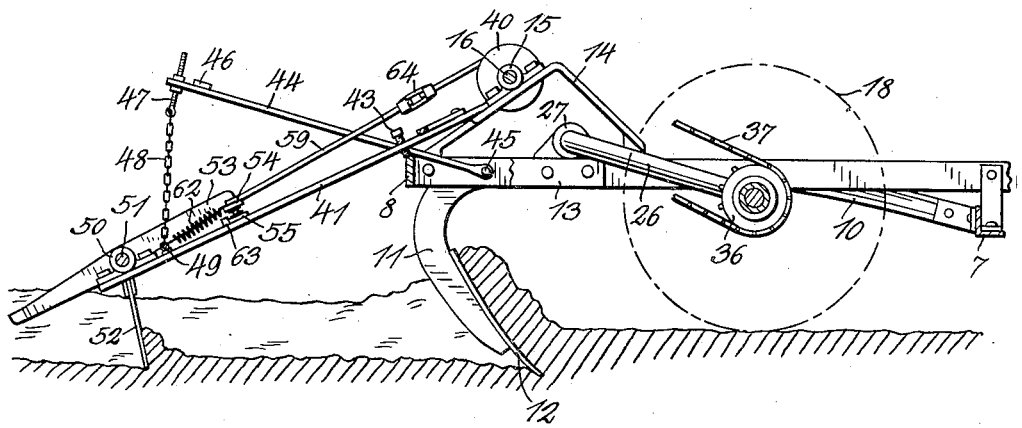
Fig.2.
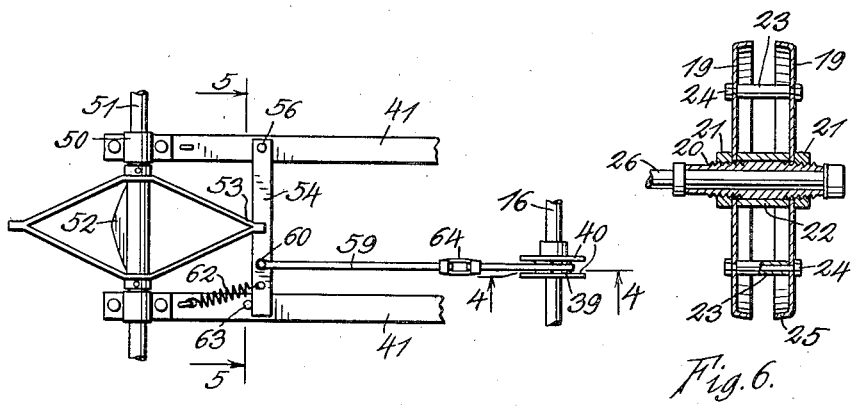
Fig.3.
Fig.6.
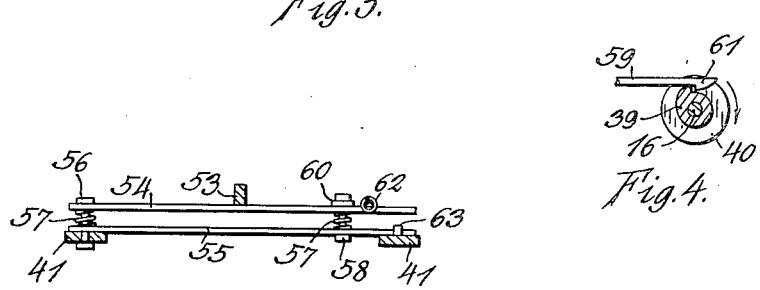
Fig.4.
Fig.5.
Inventor
Charles T. Peacock.
Attorney Patented Dec. 27, 1932

1,892,002

UNITED STATES PATENT OFFICE

CHARLES T. PEACOCK, OF ARRIBA, COLORADO

COMBINED LISTER AND DAM FORMING DEVICE

Application filed February 15, 1932. Serial No. 592,983.

This invention relates to improvements in agricultural implements and has reference more especially to an improvement in that type of implement generally known as listers.

In United States Letters Patent No. 1,814,848 granted to me on July 14, 1931, a lister has been shown and described which is also provided with means for producing dams in the furrows for the purpose of preventing erosion and to conserve the water.

It is the object of this invention to produce an improved lister of the type described and claimed in the patent above identified.

In order to facilitate the description of the invention so as to make this application independent of the patent above mentioned, I will describe briefly the method pursued in cultivating land in semiarid regions where the rainfall is insufficient for raising crops every year. In these parts of the country it is customary to raise crops every other year only, and to let the land lie fallow between crop seasons. During the year that the land is fallow, it is worked by means of an implement resembling a lister which cuts deep furrows or trenches that are left open for the reception of rain water and which facilitates the absorption of the water and its penetration into the sub-soil where it is stored for the next season's crop. The ground is usually worked several times during the season by means of the implement referred to for the purpose of preventing the formation of weed growth and also to keep the soil in a loose condition so that it will absorb all the water precipitated. The implement as above indicated, produces trenches that are separated by ridges and the second time the ground is worked, the ridges are "busted", by running the lister shovels in the ridges or directly between the trenches. After the field has been worked twice in the same direction, it is then usually worked crosswise.

It has been found that where soil is worked in the manner described, the long trenches thereby produced permit the water that is precipitated during heavy rains to flow in these trenches and thereby set up erosion.

It is the object of this invention to produce a device of the class referred to that shall be adapted not only to produce the trenches in the manner described, but which will also be provided with means for providing dams in the trenches at short distances apart. The spaces between the dams form cavities or depressions that will hold a large amount of rain water until the water can be soaked up by the soil. It is a characteristic of the country where the rainfall is insufficient for general farming that the rain when it does occur, occurs in heavy short showers during which a large amount of water is precipitated. Unless the trenches are provided with dams, this large and sudden downpour of rain will invariably start erosion, which it is the object to prevent by means of the machine that forms the subject of this invention.

In the patent above identified, a lister has been shown that is provided with means for forming dams in the trenches, this means consisting of scraper parts that are located so as to travel in the trenches and which are intermittently raised and lowered by means of a suitable mechanism. Although the mechanism described and claimed in the patent referred to is practical, it has been found that the same result can be produced by means of a different type of mechanism whose operation is somewhat different from that described in the patent, and it is to this improved mechanism that this invention relates.

This invention briefly described, consists of a lister of the ordinary construction comprising a rectangular frame supported on wheels and provided with a plurality of beams to which lister shovels are attached. Secured to the frame is another frame that extends rearwardly and which carries a rotatable shaft extending transversely of the direction of travel. Fastened to this shaft are several blades that are so located that they will project into the trenches at the rear of the lister shovels and scrape loose dirt so as to form the dams desired. Instead of scraper blades being intermittently lifted, means is provided for rotating the shaft to which they are attached, and an escapement is provided that controls this rotation. When the lister is in operation the scraper blades are held in inoperative position for a short length of time and they are then released by the escapement, thereby leaving the accumulated dirt as a dam and are again brought into operative position so as to produce a series of dams in each trench.

The objects above set out are attained by means of a mechanism like that described in the above paragraph and which has been illustrated in the drawings to which reference will now be had, and in which:

Fig. 2 is a transverse section taken on line 2—2, Fig. 1;

Fig. 3 is a top plan view of the escapement mechanism showing the same to a somewhat larger scale;

Fig. 4 is a section taken on line 4—4, Fig. 3, and shows the cam and pawl which form parts of the escapement mechanism;

Fig. 5 is a view taken on line 5—5, Fig. 3, and shows the construction of the resultant abutment which forms part of the escapement mechanism; and Fig. 6 is a diametrical section through one of the wheels showing the construction of the same.

Figure 1:
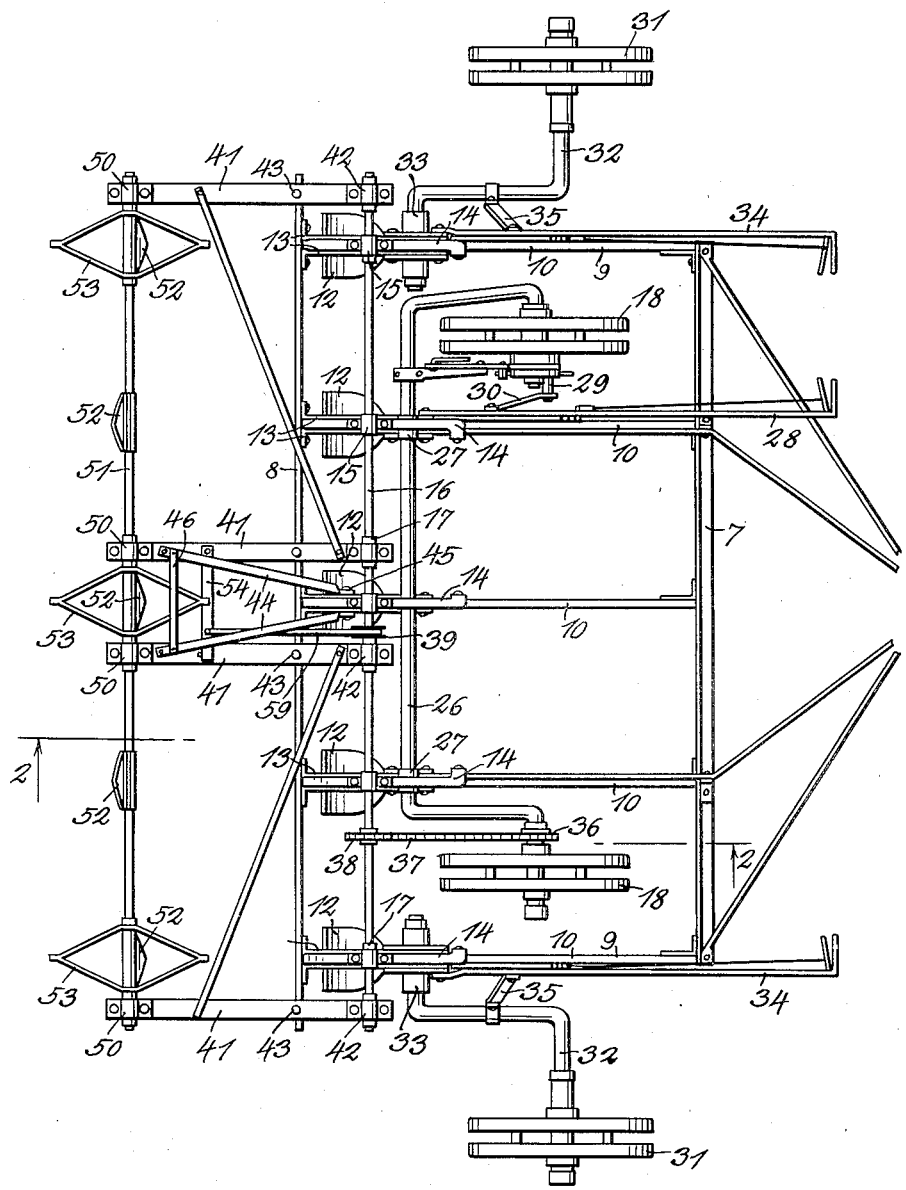
Fig. 1 is a top plan view of the implement forming the subject of this invention.

The lister which forms the basis of the mechanism is of a well known construction and comprises a rectangular frame having a front transverse member 7 and a rear transverse member 8. These two members are parallel and have their ends connected by means of bars 9. The bars 9 may be formed in part by the beams to which the lister shovels are attached. Extending between the bars 7 and 8 are five lister beams 10 whose rear ends are curved downwardly as indicated at 11 all having blades or shovels 12 attached to them. The bar 8 is attached to each of the beams by means of two flat bars 13 as shown quite clearly in Fig. 1. Secured to each of the beams 10 and the associated frame members 9 and 13, are brackets 14. These brackets are usually formed from flat steel bars and are provided on their upper surface with bearings 15. A shaft 16 is journaled in the bearings 15 and it has its extremities extending beyond its outermost bearings in the manner shown in Fig. 1. Collars 17 are provided to prevent the shaft 16 from moving longitudinally. The frame of the lister is supported on two wheels 18 of the type illustrated in Fig. 6. Each of these wheels is composed of two disks 19 that are secured to a tubular hub 20 by means of nuts 21. A spacer 22 is located between the disks and the distance between the disks is determined by means of the length of this spacer. To give the wheels strength, several spacers 23 are provided at different points and bolts 24 are passed through these spacers and tightened so as to form a very rigid wheel. The outer edges of the disks are bent inwardly so as to provide flanges 25 as shown in the drawings. The wheels are secured to the outer ends of an axle 26. This axle is journaled in bearings 27 secured to the beams and corresponding frame members, since the construction of the axle 26 and the mechanism by which the height of the frame is adjusted is old and well known, a detailed description will not be given here, but attention is called to the fact that by means of a lever 28, the shaft 26 can be rocked about its axis so as to raise and lower the frame. One of the wheels is provided with a mechanism comprising a pin 29 and a connecting rod 30, which serves to raise the frame when the lever 28 is operated.

In addition to two supporting wheels 18, the frame is also provided with two guide wheels 31. These guide wheels are constructed in the same manner as the wheels 18 and are secured to the outer ends of Z-shaped axles 32. These axles have one end journaled in bearings 33 and can be rotated about the centers of these bearings by means of levers 34 and connecting rods 35.

A sprocket wheel 36 is secured to one of the supporting wheels and is connected by means of a sprocket chain 37 to a sprocket wheel 38 secured to the shaft 16. Shaft 16 also carries a cam 39 like that shown in Fig. 4. Located at each side of cam 39 are guide disks 40, whose function will hereinafter appear.

A plurality of bars 41 of which four have been shown in the drawings, are provided at their forward ends with bearings 42, through which the shaft 16 extends. These bars extend rearwardly and downwardly in the manner shown in Fig. 2 and are each provided with a set screw 43 which is so positioned that it contacts with the upper edge of bar 8 and serves as a stop or support for the bars 41. In addition to the support afforded by the set screw 43, another support is also provided which consists of two bars 44, whose forward ends are connected to one of the beams by means of a bolt 45 and which extend rearwardly and have their rear ends connected by a transverse member 46. An eye bolt 47 is secured to the rear end of each of the bars 44 and a chain 48 extends from the eye bolt to a suitable connection 49 carried by the two center bars 44. Secured to the outer ends of each of the bars 41 are bearings 50 and mounted in these bearings is a shaft 51. Shaft 51 has secured to it by suitable means blades 52. These blades are of such shape that they conform to the size of the trench made by the shovels 12 and when they are in the position shown in Fig. 2, they form scrapers that gather up the loose dirt into piles which form transverse dams in the trenches. In order to hold the shaft 51 against rotation during the operation of the shovels, an escapement has been provided.

This escapement consists of what is termed a diametrical spoke 53. This spoke is formed from two bars connected at their ends and spread apart at their center so as to form an assembly having what may be termed a diamond shape. These spokes are secured to the shaft 51 in such a way that they will not rotate with respect to the shaft. A stop or abutment comprising an upper bar 54 and a lower bar 55 is attached to one of the supporting bars 41 by means of a bolt 56. A spring 57 surrounds this bolt and is located between the two bars. Another spring 57 is interposed between the two bars near their other ends and a bolt 58 passes through the bars and through this spring. It will be obvious from an inspection of Fig. 5, that when pressure is applied to bar 54, it will tend to compress the springs 57 and since the bar 54 is made from flat steel, this will also bend slightly so that the abutment will therefore be yieldable. A rod 59 has one end connected to the abutment at 60 and the other provided with a hook 61. The end having the hook is located between the two plates 40 and rests on the cam 39 and when the latter is rotated in the direction of the arrow in Fig. 4, the radial edge of the cam will strike the hook and move the bar towards the right until the cam rotates sufficiently to release the bar 59, thereby permitting the spring 62 to return the abutment to a position in which it contacts with the stop 63. A turn buckle or some equivalent means 64 is provided in the bar 59 so as to adjust its length to correspond to the position required for obtaining the best operation. When the parts are in normal position, one end of one of the diametrical spokes 53 rests on the upper surface of bar 54 and holds shaft 51 against rotation. When the shaft 16 rotates, the interaction of the cam with the hooked end 61 will move the abutment so as to release the spoke 53 and thereby permit the shaft 51 to turn half a revolution. In the drawings the scraper blades 52 have been shown as projecting in opposite directions and thereby when the parts are in the position shown in Fig. 1, three of them will be in operative position, but after the shaft has turned through a half a revolution, the other two blades will be in operative position. The dams will be offset from each other due to the fact that alternate scraper blades are operative at the same time only.

The distance between the dams is controlled by the rate at which the shaft 16 turns and this again is controlled by the ratio between the sprocket wheels 36 and 38.

It is also possible to provide the cam 39 with two teeth instead of one, as shown in Fig. 4, in which event the escapement would be operated twice for each revolution of this shaft. As the distance between dams is a matter to be determined by experiment, the exact ratio between the different devices is not pointed out here as it in nowise affects the invention.

Let us now assume that the machine has been constructed in the manner described and that it is being pulled over a field by means of a tractor. The shovels 12 will cut deep trenches and pile the dirt in ridges between the trenches. The scraper blades 52 will be pulled along and will gather the loose dirt into piles and then when the shaft 51 is released, the blades will turn and leave these piles so as to form dams. It is evident that instead of having blades 52 projecting from one side only, they can be double blades in which case the dams will all be placed in alignment, but this can do no particular harm and may be an improvement over the construction shown, because with the construction in which the blades are single, the space between dams will have unequal lengths, whereas when two blades are provided at each trench, the space between dams will be short but of substantially equal length which can be just sufficient for the dams to perform their function and therefore the use of single blades as shown must be considered as illustrative only and not as limiting the invention to this construction.

The double wheels formed from two disks spaced apart as shown in the drawings are considered to be of considerable importance because such a wheel does not press down the center of the trench and therefore leaves the soil in better condition for absorbing water. With a machine constructed in the manner shown, one of the guide wheels 31 will travel in a trench that has been provided with dams and must, of course, pass through these dams or over them, which has a tendency to reduce the effectiveness of the dam. It is possible, however, by attaching a chain or other drag to the axles 32, to partly fill in the cuts and even if they are not filled in by some means like this, the loose soil will soon drop into place and the dams will be substantially as effective as if the wheel had not passed over them.

I want to call particular attention to the fact that in this construction the blades 52 rotate instead of being intermittently raised and lowered as by means of the mechanism described and claimed in the patent above identified. The use of a shaft 51 and an escapement provides a simpler machine and one that operates with less noise and with less wear and tear than the one in which the scaper shovels are intermittently raised and lowered. It is believed that the construction shown and described in this application is new to the extent that the scraper blades are rotated about an axis and applicant therefore desires to claim this as broadly as the art permits.

Having described the invention what is claimed as new is:

1. A lister comprising, in combination, a frame, means for supporting the frame, a plurality of shovels attached to the frame and adapted to form spaced trenches, a plurality of supporting bars having their front ends connected to the frame and extending rearwardly to a point to the rear of the shovels, a shaft carried by the rear ends of the bars and rotatably connected to them, a plurality of scraper blades attached to the shaft, said blades being located directly behind the shovels and adapted to project into the trenches to form dams, means for holding the shaft against rotation, and means for releasing the shaft at predetermined intervals whereby the scraper blades will rotate about the axis of the shaft.

2. A lister comprising, in combination, a frame, means for supporting the frame, a plurality of shovels attached to the frame and adapted to form spaced trenches, a plurality of supporting bars having their front ends connected to the frame and extending rearwardly to a point to the rear of the shovels, a shaft carried by the rear ends of the bars and rotatably connected to them, a plurality of scraper blades attached to the shaft, said blades being located directly behind the shovels and adapted to project into the trenches to form dams, and an escapement mechanism for controlling the rotation of the shaft.

3. A lister comprising, in combination, a frame, means for supporting the frame, a plurality of shovels attached to the frame and adapted to form spaced trenches, a plurality of supporting bars having their front ends connected to the frame and extending rearwardly to a point to the rear of the shovels, a shaft carried by the rear ends of the bars and rotatably connected to them, a plurality of scraper blades attached to the shaft, said blades being located directly behind the shovels and adapted to project into the trenches to form dams, an escapement mechanism for controlling the rotation of the shaft, and means for adjusting the position of the supporting bars with respect to the frame.

4. A lister comprising, in combination, a frame, means comprising a pair of wheels for supporting the frame, a plurality of beams secured to the frame, a shovel secured to each beam, a number of brackets secured to the upper side of the frame, a shaft supported by the brackets and mounted for rotation, means operated by the rotation of one of the wheels for rotating the shaft, a plurality of supporting bars having one end pivotally attached to the shaft and extending rearwardly to a point at the rear of the shovels, a shaft carried by the bars and mounted for rotation, an escapement for controlling the rotation of the shaft, means controlled by the rotation of the first mentioned shaft for controlling the escapement, and a plurality of scraper blades secured to the second mentioned shaft, said blades being located behind the shovels and adapted to form dams.

5. A lister comprising, in combination, a frame, means comprising a pair of wheels for supporting the frame, a plurality of beams secured to the frame, a shovel secured to each beam, a number of brackets secured to the upper side of the frame, a shaft supported by the brackets and mounted for rotation, means operated by the rotation of one of the wheels for rotating the shaft, a plurality of supporting bars having one end pivotally attached to the shaft, and extending rearwardly to a point at the rear of the shovels, a shaft carried by the bars and mounted for rotation, an escapement for controlling the rotation of the shaft, means controlled by the rotation of the first mentioned shaft for controlling the escapement, a plurality of scraper blades secured to the second mentioned shaft, said blades being located behind the shovels and adapted to form dams, and means for adjusting the position of the bars and second mentioned shaft with respect to the frame.

6. A lister comprising, a substantially rectangular frame, means for supporting the frame, a plurality of shovels attached to the frame and positioned to form trenches when the frame is moved over the surface of a field, a second frame attached to the first and projecting rearwardly thereof to a point to the rear of the shovels, a shaft rotatably connected with the second frame, a plurality of scraper blades attached to the shaft, and an escapement mechanism for controlling the turning of the shaft.

7. A lister comprising, a substantially rectangular frame, means for supporting the frame, a plurality of shovels attached to the frame and positioned to form trenches when the frame is moved over the surface of a field, a second frame attached to the first and projecting rearwardly thereof to a point to the rear of the shovels, a shaft rotatably connected with the second frame, a plurality of scraper blades attached to the shaft, an escapement mechanism for controlling the turning of the shaft, and means operated by the movement of the machine over the ground for controlling the escapement.

8. A lister comprising, a substantially rectangular frame, means for supporting the frame, a plurality of shovels attached to the frame and positioned to form trenches when the frame is moved over the surface of a field, a second frame attached to the first and projecting rearwardly thereof to a point to the rear of the shovels, a shaft rotatably connected with the second frame, a plurality of scraper blades attached to the shaft, an escapement mechanism for controlling the turning of the shaft, means operated by the movement of the machine over the ground for controlling the escapement, and means for adjusting the position of the second frame with respect to the first.

In testimony whereof I affix my signature.

CHARLES T. PEACOCK.